United States Patent [19]

Piercy

[11] Patent Number: 5,039,254

[45] Date of Patent: Aug. 13, 1991

[54] PASSIVE GRABBING APPARATUS HAVING SIX DEGREES OF FREEDOM AND SINGLE COMMAND CONTROL

[75] Inventor: W. Bruce Piercy, Kailua, Hi.

[73] Assignee: Science Applications International Corporation, San Diego, Calif.

[21] Appl. No.: 451,288

[22] Filed: Dec. 14, 1989

[51] Int. Cl.[5] ............................................. B23Q 1/04
[52] U.S. Cl. .................................... 405/191; 114/312; 405/188; 403/55; 403/84; 901/8; 901/19
[58] Field of Search ......................... 269/32, 61, 71, 72, 269/231, 234; 403/55, 84; 405/191, 192, 188; 114/312; 901/15, 29, 41, 42, 6, 8, 50, 19; 414/735

[56] References Cited

U.S. PATENT DOCUMENTS

| | | |
|---|---|---|
| 709,339 | 9/1902 | Emmert . |
| 4,336,926 | 6/1982 | Inagaki et al. ........................ 269/34 |
| 4,564,179 | 1/1986 | Hollingsworth ..................... 269/71 |
| 4,620,819 | 11/1986 | Marsland et al. ............... 114/312 X |
| 4,653,739 | 3/1987 | Moore ................................... 269/61 |
| 4,655,662 | 4/1987 | Yoshieda et al. ..................... 414/14 |
| 4,721,055 | 1/1988 | Pado .............................. 405/188 X |

FOREIGN PATENT DOCUMENTS

| | | | |
|---|---|---|---|
| 2530577 | 1/1984 | France ................................ 114/312 |
| 0173787 | 7/1988 | Japan ................................. 114/312 |

OTHER PUBLICATIONS

"Development of Deep-Ocean Work System", N. Estabrook, Mechanism and Machine Theory, vol. 12, No. 5, 1977, pp. 569-576.

Primary Examiner—Frank E. Werner
Assistant Examiner—James Eller
Attorney, Agent, or Firm—Fitch, Even, Tabin & Flannery

[57] ABSTRACT

A six degree of freedom grabbing apparatus (20) allows normally open jaws (22) to be positioned in a desired location and orientation relative to a work platform (19), whereupon a single control locks the grabbing apparatus is the desired location and orientation. The jaws (22) are secured to the end of an arm (24). The arm (24) is attached to a shoulder joint (26). The shoulder joint allows the arm to rotate (37) and pitch (38). The shoulder joint is secured to a base unit (28), which base unit is slidably and pivotally connected to the work platform (19, 80), allowing the base unit (and hence the shoulder joint and arm) to move in the same plane, e.g., the x and y directions, as the work platform, and further allowing the base unit, shoulder joint and arm to yaw (39) relative to a given position on the platform. Six degrees of freedom are provided by the apparatus; jaw closing/opening; pitching, rotating, yawing, moving in the x direction, and moving in the y direction. A single locking force, enabled from a single locking control signal, closes the jaws, locks the arm to the shoulder joint, and locks the shoulder joint to the work platform, in that sequence. The invention includes a method of locking a plurality of locking mechanisms, such as a jaw, shoulder joint, and base unit, in a desired sequence using a single locking force.

14 Claims, 4 Drawing Sheets

PASSIVE GRABBING APPARATUS HAVING SIX DEGREES OF FREEDOM AND SINGLE COMMAND CONTROL

The present invention was developed for the Naval Ocean Systems Center, Kailua, Hi., under NOSC Contract No. N66001-87-D-0151, Task 0057. The Federal Government may have certain rights in this invention.

BACKGROUND OF THE INVENTION

The present invention relates to passive apparatus and methods used to secure, lock, grab, grip or otherwise hold a desired object relative to a work surface. More particularly, the present invention relates to such apparatus and methods exhibiting six degree of freedom movement, and operable as controlled by a single command signal. As used herein, the term "passive" means that independent means, external to the apparatus, must be used to place or position the apparatus in a desired position prior to activating the single command control that locks it in the desired position.

A common and well known example of a passive clamping apparatus is a pair of pliers, having jaws at one end that move in and out as controlled by applying manual forces to handles at the other end. Numerous configurations and styles of pliers are known in the art.

Another common type of passive clamping apparatus is a vice, having jaws that selectively move to a closed or open position as controlled manually through the use of a lead screw or equivalent mechanism that moves one jaw relative to the other. As with the pliers, there are numerous styles and configurations of vices known in the art. U.S. Pat. No. 709,399, for example, illustrates a six-degree of freedom vice having mechanical movement capabilities, as follows: (1) up/down; (2) in/out; (3) tilt or pitch; (4) rotation; (5) yaw; and (6) jaws in/-out.

Frequently, there is a need in the art for a work holder that is readily positioned in a desired location and orientation, e.g., manually, and then locked in that position through the application of a suitable locking force, thereby allowing work to be performed on the work piece being thus held while maintaining such work piece in the desired position and orientation. U.S. Pat. No. 4,564,179 discloses one type of such a work holder. In the '179 patent, for example, the work holder includes a plurality of articulated arms that allow a clamp to be manually positioned in any plane and position. When a user selects the desired position, hydraulic pressure is applied simultaneously to all of the articulated joints to lock them, from a single control. The hydraulic pressure is applied from a central cylinder to each joint via a separate hydraulic line. As such, each joint locks simultaneously.

Some applications for using a work holder, however, such as where the positioning of the work piece must be very precise, may require that the joints of the multi-joint work holder be locked in a prescribed sequence. For such an application, the prescribed locking sequence is achieved by applying the requisite locking forces to each joint in the desired sequence, thus necessitating a separate control line for each joint, and an associated control system for generating or controlling the forces that are to be directed to each joint in the correct sequence and timing relationship.

Still other applications for using a work holder, or similar passive clamping or grabbing apparatus, require that the grabbing apparatus be at a location remote from or inaccessible to an operator or user. For such remote or inaccessible use, it is desirable to simplify the linkage between the user and the grabbing apparatus. Unfortunately, however, if the grabbing apparatus includes multiple joints, and if it is desired to lock the joints in a prescribed sequence, the linkage and associated controls tend to become more complex, rather than simpler. Thus, there is a need in the art for a multi-joint grabbing apparatus that can be used remotely from an operator for tasks requiring a prescribed locking sequence of its joints that provides a simple control linkage from the operator to the apparatus.

Other uses of a passive clamping or grabbing apparatus also require precise locking capabilities and a simple control linkage. For example, in the use of remotely operated vehicles, there is typically provided one or more manipulators, e.g. robotic arms, designed to perform a variety of robotic tasks. Placed on such vehicles within reach of such manipulators there is typically found a platform or tray on which various tools are carried. These tools are used to assist a manipulator as it performs an assigned task. Many of these remotely performed tasks require that the vehicle and its work platform be properly stabilized or anchored before such tasks can be carried out. Such stabilization has heretofore been achieved by using at least one manipulator to clamp the workstation to a desired anchor or other support while the task is performed. Unfortunately, using a manipulator for this anchoring or stabilizing function ties up the manipulator, thereby preventing it from being used for other purposes, even though it has the capability of performing a wide variety of complex robotic tasks that far exceed its functioning as an anchor or stabilizer. What is needed, therefore, is a clamping or grabbing tool that can be used in conjunction with the robotic manipulators of a remotely operated vehicle, or similar robotic device, for stabilizing the vehicle or device and its work platform, and freeing up the manipulators for other tasks better suited to their capabilities.

The present invention advantageously addresses the above and other needs.

SUMMARY OF THE INVENTION

The present invention provides a passive grabbing apparatus having six degrees of freedom. The apparatus includes closable jaws (normally opened) that can be readily positioned in a desired location and orientation relative to a work platform. The jaws can thus be used, once in the desired position, to hold a work piece in a desired orientation relative to the platform, or to secure the work platform to a desired anchor or other support.

In keeping with one aspect of this invention, the jaws of the passive grabbing apparatus are secured to the end of an arm. The arm is attached to a shoulder joint. The shoulder joint allows the arm to rotate and pitch relative thereto. The shoulder joint is secured to a base unit. The base unit is slidably and pivotally connected to the work platform, allowing the base unit (and hence the shoulder joint and arm) to move in the same plane, e.g., the x and y directions, as the work platform, and further allowing the base unit, shoulder joint and arm to yaw relative to a given position on the platform.

Advantageously, six degrees of freedom are provided by the apparatus of the invention: (1) jaws closing/opening, (2) pitching, (3) rotating, (4) yawing, (5) moving in the x direction, and (6) movement in the y direction. Such movement allows the jaws to be easily positioned into any desired orientation relative to the platform. Once, in the desired position, a single locking force, enabled from a single locking control signal, locks the apparatus in the desired position. For example in one embodiment, the single locking control signal closes the jaws, locks the arm to the shoulder joint, and locks the shoulder joint to the work platform, in that sequence. Thus, the control linkage to the apparatus, as well as the means utilized to generate the control signal, is greatly simplified.

In keeping with another aspect of the invention, there is provided not only a passive grabbing apparatus having six degrees of freedom operable with a single command control, but also a system or method of locking a plurality of locking mechanisms, such as the joints of a multi-joint grabbing apparatus, (e.g., jaws, shoulder joint, and base unit), in any desired sequence using a single locking force.

The prescribed locking sequence of the joints of the grabbing apparatus is controlled through the use of internal biasing forces that force each joint of the grabbing apparatus to its open or movable position in the absence of a locking force. These internal biasing forces are selected to be less than the final value of an increasing (e.g., ramped) external locking force that is applied to each joint, but different from each other. Thus, in operation, the external locking force is applied to the joints simultaneously and ramps up (or otherwise increases) to a desired locking value greater than the strongest internal biasing force, thereby assuring that each joint is eventually locked. However, as the external locking force increases to its maximum value, the point in time at which it exceeds the respective internal biasing force of each joint, thereby causing that joint to lock, is different as a function of the strength of the internal biasing force. Hence, by selectively controlling the internal biasing forces of each joint, an ordered sequence of the locking of each joint is advantageously achieved.

In a preferred embodiment, the internal biasing forces of the grabbing apparatus are provided by suitable springs, such as coil springs, having selected spring constants. These internal springs are mounted within each movable joint so as to bias that joint in its open or movable position. An external locking force is generated using a hydraulic force, which a hydraulic force may be easily controlled by a single control line directed to a single double acting solenoid valve. As the hydraulic force is simultaneously applied to all of the joints, it increases from a minimum hydraulic pressure to a maximum hydraulic pressure. The minimum hydraulic pressure produces a force less than the weakest spring force. The maximum hydraulic pressure produces a force greater than the strongest spring force. Hence, as the hydraulic pressure increases from its minimum to its maximum values, the forces thus generated overcomes the various internal spring forces of each joint in an ordered sequence, thereby causing each joint to lock in an ordered sequence.

While there are numerous uses for the present invention, the preferred use is as a clamping or grabbing tool used with a remotely operated vehicle (ROV). ROV's are used on land, underwater, in space, or in any other location not easily accessible by human beings, such as inside pipelines, deep inside mines or wells, and the like. In such use, a manipulator of the ROV grasps the grabbing tool while in an unlocked state and positions it in a desired location and orientation so as to help stabilize the ROV. Once in the desired position, a single command locks the tool, thereby maintaining the stabilization of the ROV, and freeing up the manipulator for other tasks while the ROV is thus stabilized. When the desired tasks are complete, and stabilization of the ROV is no longer needed, the single locking command is removed, thereby unlocking the grabbing tool, and allowing the manipulator to return the grabbing tool to a desired position on the tool tray or platform of the ROV.

A broad description of one embodiment of the present invention may be characterized as a grabbing apparatus that selectively assumes a locked or an unlocked state. Such apparatus includes: (a) a platform; (b) a base unit slidably attached to the platform; (c) a shoulder joint secured to the base unit, the shoulder joint and base unit being slidably movable about the platform, the shoulder joint being rotatable about a given position on the platform when the grabbing apparatus assumes its unlocked state; (d) an arm attached to the shoulder joint, the arm being turnable and pivotable relative to the shoulder joint when the grabbing apparatus assumes its unlocked state; (e) closeable jaws secured to an end of the arm, the closeable jaws assuming an open position when the grabbing apparatus assumes its unlocked state; (f) locking means for selectively causing the grabbing apparatus to assume its locked state upon application of a single locking force thereto, the locked state having the closeable jaws forced towards a closed position, the arm locked and prevented from turning or pivoting relative to the shoulder joint, the shoulder joint locked and prevented from rotating relative to the base unit, and the base unit locked and prevented from moving relative to the platform; and (g) biasing means for causing the grabbing apparatus to assume its unlocked state upon removal of the single locking force.

A further embodiment of the invention provides a grabbing tool that is designed to be used with a remotely operated vehicle (ROV). Such ROV has at least one manipulator arm protruding therefrom with a platform near the manipulator arm so that the manipulator arm can selectively grasp various tools, including the grabbing tool of the present invention, on the platform. The grabbing tool includes: (a) an extending arm having a clamping mechanism disposed at a first end thereof, the clamping mechanism including biasing means for holding the clamping mechanism in an open position; (b) a shoulder joint connecting a second end of the extending arm to the platform, the shoulder joint allowing the arm to rotate and pitch relative thereto; (c) means for securing the shoulder joint to the platform, the securing means allowing the shoulder joint and extending arm to yaw relative to the platform, the securing means further allowing the shoulder joint to slidably move on said platform to a desired location while still remaining secured to the platform; and (d) locking means for selectively locking the clamping mechanism in a closed position, locking the extending arm to the shoulder joint, and locking the shoulder joint to the platform. In use, the manipulator arm grasps the grabbing tool from the platform and moves it to a desired position and orientation, while the clamping mechanism is in its open position, and while the extending arm and shoulder joint are free to move as needed in order to achieve the desired position and orientation. Once in the desired position and orientation, the grabbing tool is locked, thereby causing the clamping mechanism, extending arm, and shoulder joint to maintain the locked position. Advantageously, once the grabbing tool is locked in this manner, the manipulator arm can be released and is free to perform other robotic tasks. For example, the grabbing tool may be used to help stabilize the platform by locking the platform to some desired anchor or support.

Still further, the present invention may be viewed as a locking system for locking a plurality of movable joints in a specified locking sequence using a single locking force that is applied simultaneously to all of the joints. Such system includes: means for applying a respective biasing force to each joint, each biasing force causing its respective joint to assume an unlocked position; means for adjusting the biasing force of each joint to have a value that is greater than the biasing force of a joint that is to lock prior thereto in the specified locking sequence; means for applying the single locking force to all of the joints simultaneously, this single locking force increasing to a maximum value and having a final value greater than the strongest biasing force. In use, the increasing single locking force overcomes the weakest biasing force first, causing the corresponding joint to lock first. The increasing single locking force overcomes the second weakest biasing force second, causing the corresponding joint to lock second. This process continues, with the increasing single locking force overcoming the next weakest biasing force, causing the corresponding joint to lock next in the sequence, until the single locking force overcomes the strongest biasing force last, causing the corresponding joint to lock last.

Similarly, the present invention may be viewed as a method of locking a plurality of locking mechanisms, such as the movable joints of a multi-joint grabbing apparatus, in a specified locking sequence using a single locking force. Such method includes the steps of: biasing each locking mechanism in an unlocked position using respective biasing forces; selecting a biasing force for each locking mechanism to have a biasing force that is greater than the biasing force of a locking mechanism that is to lock before the given locking mechanism in the specified locking sequence; and applying the single locking force to all of the locking mechanisms simultaneously, the single locking force when applied increasing from a first value less than the weakest biasing force to a final value greater than the strongest biasing force. As with the locking system described above, this method causes the increasing single locking force to overcome the weakest biasing force first, the second weakest biasing force second, and so on, until the strongest biasing force is overcome last, thereby causing the corresponding locking mechanisms to lock in the desired sequence. It is a feature of the present invention to provide a lockable passive gripping apparatus or tool having six degrees of freedom, thereby allowing the gripping apparatus to be readily positioned in a desired orientation and location relative to a platform to which the gripping apparatus is secured, and that further provides means for selectively locking the gripping apparatus in its desired position and orientation relative to the platform using a single locking force. Such single locking force may advantageously be activated or deactivated by a single locking command signal.

It is another feature of the present invention to provide such a gripping apparatus that is adapted for use with a remotely operated vehicle (ROV). Such ROV includes at least one manipulator arm and a tool platform on which the apparatus of the present invention may be located. The manipulator arm of the vehicle is used to position the gripping apparatus or tool, while in a passive state, in a desired position and orientation relative to the tool platform. Once thus positioned, the gripping apparatus may be locked as needed, thereby assisting in anchoring the ROV and tool platform and further freeing up the robotic manipulator arm for other robotic tasks.

It is thus seen that one feature of the present invention is to provide a locking tool that aids in the efficient use of an ROV or similar manipulator.

It is yet another feature of the present invention to provide a locking system and method for locking a plurality of lockable mechanisms, such as the joints of a multi-joint grabbing tool, in a prescribed sequence upon the simultaneous application of a single locking force to all of the locking mechanisms.

Still a further feature of the present invention is to provide a lockable gripping apparatus with six degrees of freedom that can be controlled to assume a locked state upon application of a single locking force, such as by applying a fluid under pressure through a single hydraulic line as controlled by a single hydraulic double acting solenoid valve, and wherein the various movement mechanisms of the gripping apparatus, i.e., those that allow movement with six degrees of freedom, are locked in a fixed controllable sequence.

BRIEF DESCRIPTION OF THE DRAWINGS

The above and other aspects, features and advantages of the present invention will be more apparent from the following more particular description thereof, presented in conjunction with the following drawings wherein.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims that define the invention.

Figure 1:
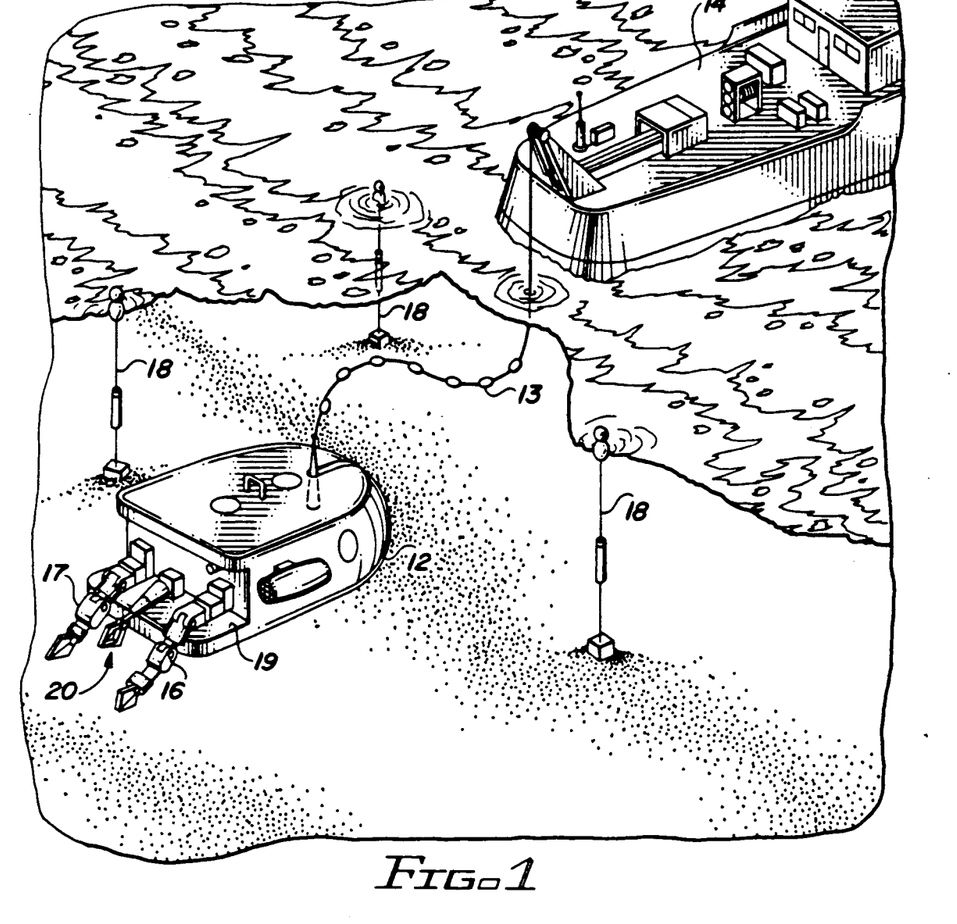
FIG. 1 is schematic representation of an ROV having a manipulator and tool tray to which the grabbing apparatus of the present invention is secured.

FIG. 1 schematically depicts a preferred application for the present invention, namely, as a grabbing tool 20 that is used with a remotely operated vehicle (ROV) 12. The ROV 12 shown in FIG. 1 is a submersible vehicle that is controlled from a control ship 14 by way of a tether and telemetry line 13. Submersed buoys 18 may be placed to mark a desired underwater area where the ROV 12 is to be operated. The ROV 12 is designed to exhibit neutral buoyancy, and includes suitable propulsion devices for guiding it to a desired location, within the area of interest, as controlled from the ship 14.

The submersible ROV 12 includes manipulator arms 16 and 17 that perform robotic tasks as controlled from the control ship 14. Positioned near the manipulator arms 16 and 17 is a platform or tool tray 19. Various tools, including the grabbing tool 20 of the present invention, may be positioned on the platform 19 for easy access by the manipulator arms. Such tools are thus readily available for use by the manipulator arms 16 or 17 in performing selected tasks. Suitable lights and one or more video cameras are also mounted on the ROV 12 to provide an illuminated picture to the control ship 14 of that which the ROV encounters as it moves about under water, or as the manipulator arms perform specific tasks.

It may be necessary while performing some underwater tasks for the ROV 12 to be more firmly anchored or stabilized. Thus, one of the functions that the grabbing tool 20 of the present invention may perform is to provide a means whereby the ROV 12 can be securely fastened to whatever underwater structure or support may exist. Once so fastened, both manipulator arms are thereafter free to perform whatever task is needed. Another function that the grabbing tool 20 may perform is to hold an object, much like a vice, that is being worked on or examined by one or both of the manipulator arms 16 or 17.

While an underwater ROV 12 is shown in FIG. 1, and while such an underwater ROV represents the preferred application for use of the present invention, it is to be appreciated that the grabbing tool 20 of the present invention is not to be limited to underwater use, or even to use with an ROV. As will be evident from the description that follows, the grabbing tool 20 may be used with any type of ROV, or for any of a wide variety of grasping or grabbing functions, both locally and remote, where a work piece must be held relative to a support platform.

Figures 2, 3B:
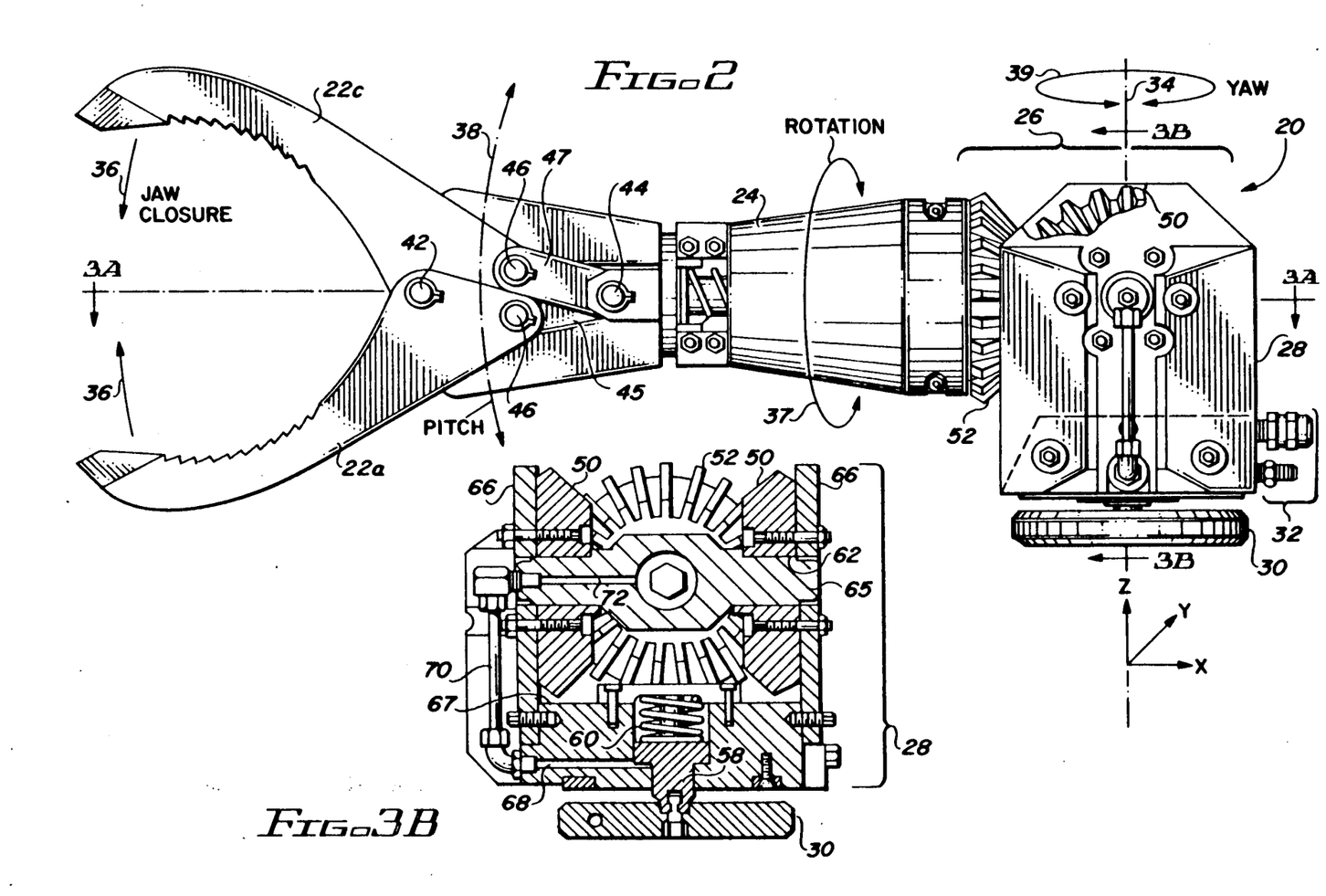
FIG. 2 is a side view of a preferred embodiment of the grabbing apparatus of the present invention in an unlocked condition.
FIG. 3B is a sectional view of the apparatus taken along the line 3B—3B of FIG. 2.

FIG. 2 shows a side view of the grabbing tool 20 of the present invention in an unlocked state. As seen in FIG. 2, the tool includes jaws 22a and 22c (sometimes referred to hereafter as simply the jaws 22) that are mounted for closure at the end of an arm 24. The arm 24, in turn, is coupled to a base unit 28 by way of a shoulder joint 26. The shoulder joint 26 provides for the rotation of the arm 24 relative to the base unit 28, as well as the pitching of the arm 24 relative to the base unit 28. The base unit 28 is coupled to a suitable platform (not shown in FIG. 2) by way of a base clamp 30. When unclamped, the base unit 28 may pivot about a pivoting axis 34, thereby allowing the base unit (and the arm 24 and jaws 22) to yaw relative to the axis 34. When unclamped, the base unit 28 may also move about in the same plane as the platform. If the mounting platform lies in an X-Y plane, for example, and the axis 34 is perpendicular to this plane, i.e., the axis 34 is perpendicular to the Z axis, then the base unit 28 may also move in both the X and Y directions. The grabbing tool thus provides for six degree of freedom movement: (1) closure of the jaws 22; (2) rotation of the arm 24 relative to the base unit 28; (3) pitching of the arm 24 relative to the base unit 28; (4) yawing of the base unit 28 relative to the X-Y plane to which the base unit is attached; (5) movement of the base unit 28 in the X direction; and (6) movement of the base unit 28 in the Y direction; where the X and Y directions represent transverse movement in the plane of the platform to which the base unit is attached. Closure of the jaws is illustrated in FIG. 2 by way of the arrows 36. Rotation of the arm 24 is illustrated by the arrow 37. Pitch of the arm 24 is illustrated by the arrow 38. Yaw of the base unit 28 (and hence the arm 24 and jaws 22, i.e., the yaw of the tool 20) is illustrated by the arrow 39. Movement of the base unit 28 in the X and Y directions is better illustrated with reference to FIG. 8, explained below.

Advantageously, the tool 20 includes internal biasing means for maintaining the jaws 22 in an open position, and the shoulder 26 and base clamp 30 in an unlocked position. This unlocked state facilitates passive placement of the tool, including all of its component parts, in any desired position and orientation relative to the mounting platform to which the tool is attached. Once in a desired position, a single locking force, realized in the preferred embodiment by a conventional hydraulic system that supplies a suitable hydraulic fluid to hydraulic fittings 32, causes the tool to assume a locked state. In the locked state, the jaws 22 close; the shoulder 26 locks, preventing rotation or pitching; and the base clamp 30 clamps, preventing yawing or X-Y motion. Advantageously, this hydraulic locking force may be initiated by a single locking command signal from a remote location that is coupled to a single hydraulic double acting solenoid valve. Further, even though only a single locking force is applied to all of the various locking mechanisms of the tool, i.e., even though the same locking force is applied to the closing mechanism of the jaws 22, and to the locking mechanisms of the shoulder 26 and base clamp 30, thereby allowing a single hydraulic feed line to the tool 20, each mechanism closes or locks in a prescribed sequence relative to the other closing or locking mechanisms. This prescribed sequence in the preferred embodiment is as follows: the jaws 22 close first, followed by locking of the shoulder 26, followed by the clamping of the base unit 28 to the platform (i.e., locking of the base clamp 30). Unlocking occurs in the reverse order, i.e., the base clamp releases first, followed by release of the shoulder 26, followed by opening of the clamps 22. Unlocking is achieved by removal of the single hydraulic locking force, which action can also be effectuated through a single unlocking command. This process of sequentially locking and unlocking the various locking mechanisms of the tool using a single command that generates a single locking force is described more fully below in connection with FIGS. 5 and 6.

Figure 3A:
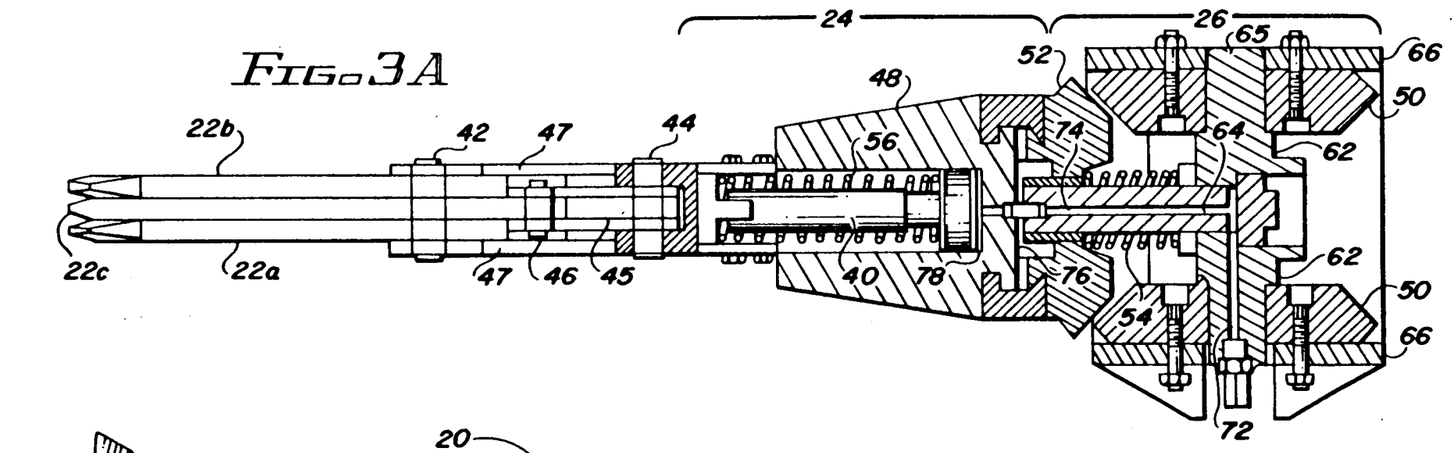
FIG. 3A is a sectional view of the apparatus taken along the line 3A—3A of FIG. 2.

Referring next to FIGS. 3A and 3B, sectional views of the tool 20 of FIG. 2 are shown taken along the lines 3A—3A and 3B—3B, respectively. These sectional views are useful for teaching the preferred manner of constructing the grabbing tool. Some of the elements discussed in connection with these sectional views are also visible in FIG. 2. Therefore, in the description that follows, reference should be made to all three figures, FIGS. 2, 3A and 3B, for a better understanding of the invention. It is noted that many of the mechanical details shown in FIGS. 2, 3A and 3B are not described because they are self-evident to those skilled in the mechanical arts. Only those elements deemed most important to understanding the present invention are described and referenced.

As seen in FIG. 3A, which is in effect a sectional top view of the apparatus of the present invention, the jaws 22 referenced in FIG. 2 are made up of a jaw front plate 22a, a jaw back plate 22b, and a jaw middle plate 22c. The front plate 22a and the back plate 22b are linked for joint movement, whereas the middle plate 22c is linked for opposing movement, i.e., to close towards the front and back jaw plates. A jaw shaft 42 provides a pivot point for movement of the jaw plates 22a, 22b and 22c.

As also seen in FIG. 3B, the arm 24 includes an assembly of several components. An arm piston housing 48 is connected to an arm gear 52. Centrally located within the arm piston housing 48 is an arm piston 40. The arm piston 40 is biased with an arm piston spring 56 so that the arm piston 40 is normally held in a retracted or recessed position within the arm piston housing 48. The jaw plates 22a, 22b and 22c and linked to the exposed end of the arm piston 40 through appropriate linkage mechanisms by way of a shoulder shaft 44. In particular, two middle links 45, one on each side of the jaw middle plate 22c, couple the shoulder shaft 44, affixed to the end of the arm piston 40, to the jaw middle plate 22c. Similarly, two side links 47, couple the shoulder shaft 44 to the jaw front plate 22a and the jaw back plate 22b. Attachment of the side and middle links to the respective jaw plates is made using a link shaft 46. Conventional means, e.g., retainer rings, are used to hold the various shafts, i.e., the shoulder shaft 44, the link shafts 46, and the jaw shaft 42, in a linked relationship with the jaw plates, links, and arm piston. Linear movement of the arm piston 40 from its retracted position to a protruding position causes the jaw plates to close. Linear movement of the arm piston 40 back to its retracted position from its protruding position causes the jaw plates to open.

The arm 24 is secured to the base unit 28 by way of a suitable shoulder linkage that allows rotation and pitch of the arm assembly relative to the base unit 28. An arm gear 52 is firmly affixed to the arm piston housing 48. Thus, as the arm assembly 24 rotates, the arm gear 52 also rotates. A shoulder piston 64 has one end locked to the center of the arm gear 52. The other end of the shoulder piston 64 fits snugly within an appropriate bore machined transversely through a central core 65 of the shoulder assembly 26. The fit of the piston 64 within such bore allows the piston to rotate as the arm assembly 24 rotates.

The central core 65 is held between two shoulder housing mounts 66. Shoulder bearings 62 within each housing mount 66 allow the central core to rotate relative to the mounts 66 as the arm assembly pitches. Shoulder gears 50 are firmly affixed to each shoulder housing mount. Gear teeth of the shoulder gears 50 are designed to mesh with matching teeth of the transversely oriented arm gear 52. However, a shoulder piston spring 54 maintains the shoulder piston 64 in an extended or protruding position relative to the central core 65. When so extended, the teeth of the arm gear 52 do not mesh with the teeth of the shoulder hears 50, and the arm assembly 24 is free to rotate and pitch. However, when the shoulder piston 64 is linearly moved to a retracted position, i.e., moved to the right from the position shown in FIG. 3A, the teeth of the arm gear 52 do mesh with the teeth of the stationary shoulder gears 50, thereby locking rotation and pitching of the arm assembly 24 relative to the shoulder housing mounts 66 (and hence relative to the base unit 28).

As seen best in FIG. 3B, the base unit 28 includes a bottom section 67 sandwiched between the lower portions of the shoulder housing mounts 66. A base piston 58 is positioned within a vertical bore centrally located within the section 67. On end of the base piston is secured to the base clamp 30. The base clamp 30, in turn, may be slideably secured to a track of a suitable work platform, not shown in FIGS. 2, 3A or 3b, as discussed below in connection with FIGS. 7 and 8. The base unit 28 may rotate about the pivot point defined by the base piston 58, as desired, thereby permitting the entire apparatus to yaw relative to the work platform. A base piston spring 60 maintains the base clamp 30 in an open or extended position relative to the bottom side of the bottom section 67 of the base unit 28. When the base piston 58 is linearly moved inwardly (i.e., upwards as oriented in FIG. 3B), the clamp 30 also moves up, thereby securely clamping the base unit to the track of the work platform.

In the embodiment of the invention shown in FIGS. 2, 3A and 3B, the preferred manner of locking the gripping tool is by way of a fluid that is supplied from a conventional hydraulic system. It is noted that an unconventional hydraulic system, including the use of unconventional hydraulic fluids, such as seawater, could also be used advantageously to lock the gripping tool. Such hydraulic system, when activated, delivers the hydraulic fluid under pressure to the hydraulic fittings 32, e.g., inlet ports and filters, thereby providing such fluid to a base hydraulic channel 68. The base hydraulic channel 68 is in fluid communication with a working surface of the base piston 58, and such contact produces a hydraulic force on the base piston 58 that opposes the biasing force of the base piston spring 60. If the hydraulic force thus applied exceeds the force of the base piston spring, the base piston 58 moves upwardly to a clamped or locked position.

Similarly, a shoulder hydraulic channel is in fluid communication with the base hydraulic channel by way of a hydraulic line 70, located along the side of the base unit 28. This channel 72 delivers the pressurized hydraulic fluid though another hydraulic channel 74, passing through the shoulder piston 64, to a shoulder hydraulic chamber 76, located behind the arm gear 52. This chamber 76 is also in fluid communication with an arm hydraulic chamber 78 located near one end of the arm piston 40.

The delivery of pressurized hydraulic fluid to the chamber 76 creates a hydraulic force that attempts to move the shoulder piston 64 to the right (when oriented as shown in FIG. 3A), in opposition to the force created by a shoulder piston spring 54, (which spring tends to force the shoulder piston 64 to the left). Similarly, the delivery of pressurized hydraulic fluid to the chamber 78 creates a hydraulic force that tends to move the arm piston 40 to the left (when oriented as shown in FIG. 3A), in opposition to the force created by the arm piston spring 56. Thus, application of pressurized hydraulic fluid to the base hydraulic channel 68 via the hydraulic fitting 32 simultaneously delivers pressurized hydraulic fluid to the chambers 76 and 78, and causes all three pistons, the base piston 58, the shoulder piston 64, and the arm piston 40, to oppose the forces created by the respective biasing springs 60, 54 and 56. As the hydraulic force overcomes the respective spring forces, the pistons thus move, locking the base clamp 30, locking the shoulder assembly 26, and closing the jaws 22, as previously described.

Figure 4:
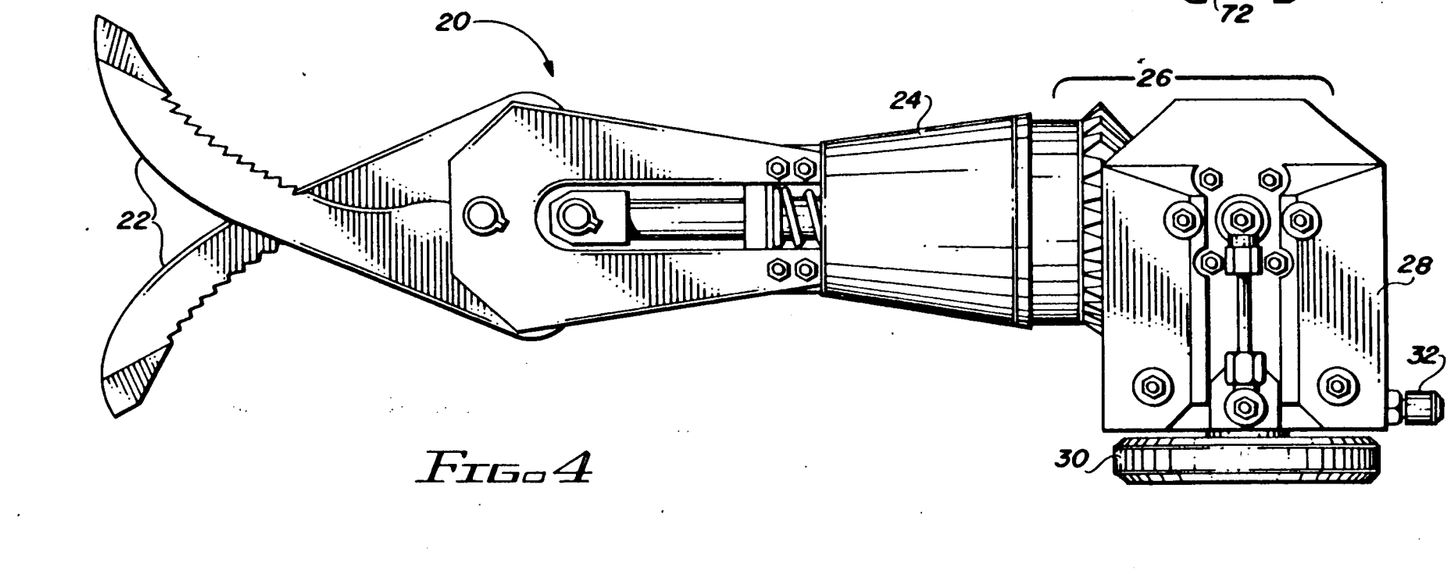
FIG. 4 is a side view as in FIG. 2 but showing the grabbing apparatus in a locked condition.

FIG. 4 shows a side view of the gripping tool 20 of the present invention, similar to the side view of FIG. 2, but after the tool has assumed a locked state. As seen in FIG. 4, the jaws 22 have closed, the arm assembly 24 is locked to the shoulder 26, and the base clamp 30 is locked or closed against the base unit 28. Advantageously, an important feature of the present invention provides that this locking process—of closing the jaws, locking the shoulder, and clamping the base—occurs in a prescribed sequence. Namely, the jaws close first, the shoulder locks second, and the base clamps third. This sequence is important in being able to successfully clamp onto a desired object with the gripping tool. That is, the object is clamped in the jaws first, thereby securing the object in the arm of the tool. Once this is done, the arm locks to the shoulder joint, thereby securing the object to the base of the tool. Lastly the base camp locks to the platform, thereby securing the tool, and the object it holds, to the work platform.

In the preferred embodiment, where the locking tool 20 is made available on a tool tray of an ROV 12, as shown in FIG. 1, the hydraulic system used by the tool may be obtained from the hydraulic system already included within the ROV 12, which hydraulic system is used in moving and controlling the manipulators 16 and 17.

Figures 5, 7:
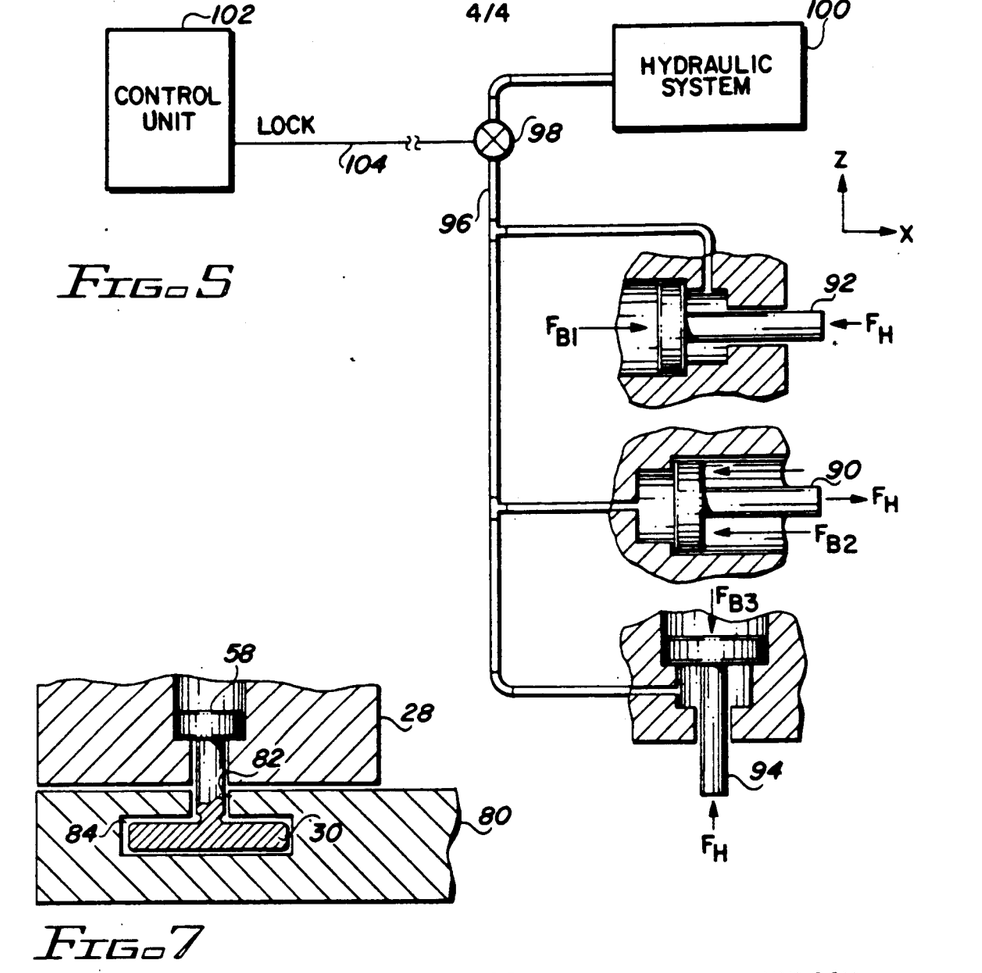
FIG. 5 is a schematic diagram of the locking system of the present invention, illustrating the manner in which a single control force is used to lock a plurality of locking mechanisms in a desired sequence.
FIG. 7 is a side cutaway view showing one manner in which the base unit of the apparatus is slideably coupled to a track within the tool tray of an ROV or other work platform.

Referring next to FIG. 5, a schematic block diagram is shown illustrating the manner in which the present invention controls a plurality of locking mechanisms in a prescribed sequence. In FIG. 5, three locking mechanisms are shown, first piston 90, a second piston 92, and a third piston 94. These three pistons may correspond, for example, to the three pistons described above in connection with FIGS. 3A and 3B (i.e., the arm piston 40, the shoulder piston 64, and the base piston 58); although it is intended that the three pistons shown in FIG. 5 be merely representative of three separate locking mechanisms, or other mechanisms involving the movement of a plunger, piston, or other actuator, wherein it is desired that all such mechanisms be controlled by a single control force, but in an ordered sequence. As shown in FIG. 5, the single control force is provided by a hydraulic system 100 that is in fluid communication with each piston by way of a hydraulic line 96 that is controlled by a single valve 98. (It is be understood, of course, that a hydraulic system is only representative of several types of systems that could be used to apply a single control force in parallel to a plurality of locking mechanisms.) The valve 98, in turn, may be controlled by a single command signal generated at a control unit 102, and delivered to the valve 98 over a single control line 104. Advantageously, the control unit 102 may be remote from the pistons 90, 92, and 94, and the hydraulic system 100. The only connection needed between the remotely located control unit 102 and the plurality of locking mechanisms is the single control line 104, thereby greatly facilitating the linkage between the control unit and the locking mechanisms. For many applications, this single control line need not even be a physical connection, but could be established using other available communication channels, such as a radio frequency (RF), optical, or microwave link.

As depicted in FIG. 5, pistons 90 and 92 are mounted for linear movement in the X direction, where the plane of the paper lies in an X-Z plane, with X being horizontal and Z being vertical. Piston 94 is mounted for movement in the Z direction. A biasing force, $F_{B1}$, is applied to piston 90 so as to force it to move in the positive X direction (to the right as oriented in FIG. 5). Similarly, another biasing force, $F_{B2}$, is applied to piston 92 so as to force it to move in the negative X direction (to the left as oriented in FIG. 5). A third biasing force, $F_{B3}$, is applied to piston 94 so as to force it to move in the negative Z direction (down as oriented in FIG. 5). The hydraulic line 96 applies a control force, $F_H$, in parallel to each of the pistons. This control force opposes the biasing forces described above. That is, the control force $F_H$ tends to move the piston 90 in the negative X direction, the piston 92 in the positive X direction, and the piston 94 in the positive Z direction. By selecting the biasing forces to have different values, and by controlling the application of the control force $F_H$ so that it increases from its off value to a maximum value in some finite time, the sequence through which the pistons begin to move can be controlled.

Figure 6:
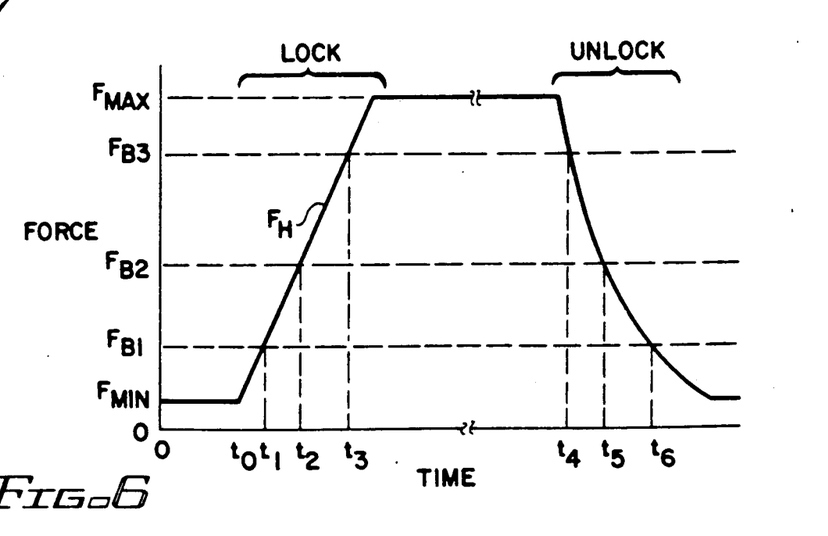
FIG. 6 is a curve showing force verses time for the locking system of FIG. 5.

This process is further illustrated in the graph shown in FIG. 6. In the graph of FIG. 6, the vertical axis represents force, while the horizontal axis represents time. The biasing forces $F_{B1}$, $F_{B2}$, and $F_{B3}$ are shown as separate points along the vertical axis, with $F_{B1} < F_{B2} < F_{B3}$. The control force $F_H$ is shown as a heavy line that increases from a minimum force value $F_{MIN}$ to a maximum force value $F_{MAX}$ over a period of time (labeled "LOCK"), and that decreases from $F_{MAX}$ to $F_{MIN}$ over another period of time (labeled "UNLOCK"). As shown, the control force $F_H$ begins to increase at time $t_0$. At time $t_1$, the force $F_H$ is equal to the biasing force $F_{B1}$. A short time instantaneously, but gradually decays.

Further, in the preferred embodiment, the biasing forces may be readily generated using springs, such as the springs 54, 56, and 60 shown in FIGS. 3A and 3B. Different biasing forces may be readily obtained by selecting appropriate spring constants for each spring thus used.

Figure 8:
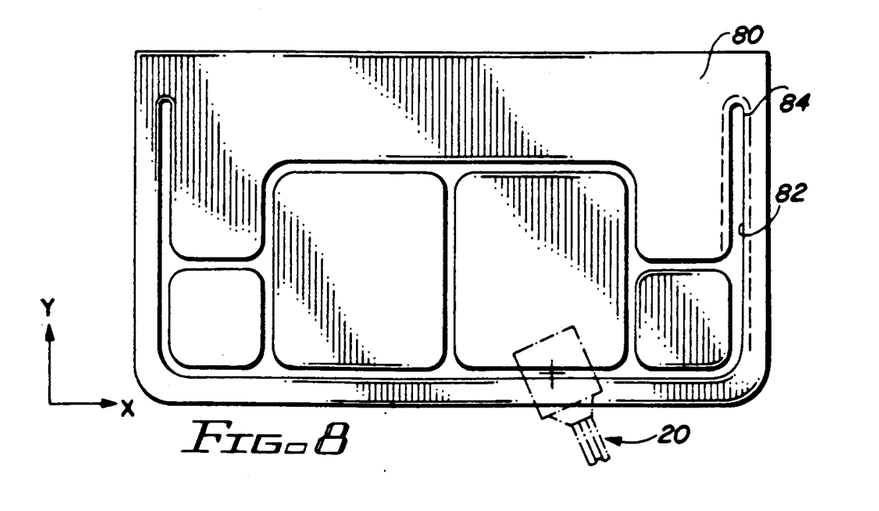
FIG. 8 is a top plan view of the tool tray or platform illustrating one pattern of tracks that could be used to permit movement of the apparatus in the X and Y directions so as to allow the apparatus to be moved to any desired zone or region of the tray or platform.

Referring next to FIGS. 7 and 8, the manner in which the grabbing tool 20 is lockably attached to a working platform 80 is illustrated. FIG. 7 includes a partial sectional view of the platform 80. A track 82 is placed in an upper surface of the work platform 80. The track 82 has a width slightly greater than the diameter of the base piston 58 where the piston connects the base clamp 30 to the base unit 28. This track 82 opens to a larger covered track 84 that has dimensions somewhat larger than the base clamp 30. The base clamp 30 and the base piston 58 are thus free to move within the tracks 82 and 84 so long as the base clamp 30 is not forced towards the base unit 28 by the hydraulic locking force. The tracks 82 and 84 are laid out in a desired pattern on the work platform, such as the pattern shown in FIG. 8. Such pattern allows the tool 20 to be slidably positioned in any location on the platform where the tool is needed. With the track pattern shown in FIG. 8, or with any other suitable pattern, the grabbing tool 20 may advantageously be positioned on the platform so as to be accessible to any area of the platform where the tool might be needed. Once at the desired location, the object or work piece to be held by the jaws of the tool is positioned within the jaws, and the single command is given to lock the tool. As has been indicated, where the tool is attached to a platform of an ROV 12, such as is shown in FIG. 1, the tool 20 may be moved into its desired position using one of the manipulator arms.

From the foregoing, it is thus seen that the present invention provides a versatile passive locking later, at time $t_2$, the force $F_H$ is equal to the biasing force $F_{B2}$. Still later, at time $t_3$, the force F is equal to the biasing force $F_{B3}$. Hence, piston 90 begins to move in the negative X direction at time $t_1$, piston 92 begins to move in the positive X direction at time $t_2$, and piston 94 begins to move in the positive Z direction at time $t_3$. Thus, by controlling the values of the biasing forces $F_{B1}$, $F_{B2}$, and $F_{B3}$, an ordered sequence of the piston movement can be achieved through application of a single control force to all of the pistons simultaneously.

It is noted that the control force shown in FIG. 6 linearly ramps up from its minimum value to its maximum value, and decays, in a quasi-exponential manner, from its maximum value to its minimum value. Such increasing and decreasing of the control force is only illustrative and is not meant to be limiting. Any increasing or decreasing of the control force over a finite period of time will provide the desired control of the locking sequence provided the biasing forces have different values. As should be evident from FIG. 6, if it is desired to increase the time delay between when the first piston starts to move and the second piston starts to move, all that need be done is to decrease the slope of the control force $F_H$ as it increases from its minimum to its maximum values.

Advantageously, in the preferred embodiment, the use of a hydraulic system to generate the control force inherently provides the requisite increasing and decreasing of the control force over a finite time period. That is, when the value 98 is activated, the force present at each piston does not increase instantaneously, but rather builds up, in a quasi-linear fashion as the pressurized hydraulic fluid reaches each piston. Similarly, when the pressurized hydraulic fluid is removed, by controlling the value 98, or equivalent in a manner that releases pressure from the system, the force present at each piston does not decrease tool that can be utilized to secure a desired object and/or orientation relative to a work platform. Such a locking tool is particularly suited for remote operation, and can be used to aid in the efficient use of an ROV or robotic manipulator. Advantageously, such tool provides a lockable grabbing apparatus with six degree of freedom movement capability that can be controlled to assume a locked state upon application of a single locking force, such as by applying a hydraulic fluid under pressure through a single hydraulic line, and wherein the various movement mechanisms of the grabbing apparatus, i.e., those that allow movement with six degrees of freedom, are locked in a fixed controllable sequence.

From the foregoing, it is also seen that the present invention provides a passive locking system and method for locking a plurality of lockable mechanisms, such as the joints of a multi-joint grabbing tool, in a prescribed sequence upon the simultaneous application of a single locking force to all of the locking mechanisms.

While the invention herein disclosed has been described by means of specific embodiments and applications thereof, numerous modifications and variations could be made thereto by those skilled in the art without departing from the scope of the invention set forth in the claims that define the invention. For example, instead of a double-dimensioned grooved track of the type shown in FIG. 7, numerous other types of tracks that allow movement of the tool about the work platform could be utilized. Further, instead of using biasing springs to generate the forces that maintain the locking mechanisms of the tool in their unlocked state, other means could be used to generate equivalent forces of differing values. Also, other forces besides a hydraulic force, such as an electromagnetic force, could be used to provide the locking force used by the invention to overcome the internal biasing forces.

What is claimed is:

1. A passive grabbing apparatus having locked and unlocked states, said unlocked state being one wherein the grabbing apparatus is freely positionable by positioning means external to the grabbing apparatus, said locked state being one wherein the grabbing apparatus is locked against movement and maintains a desired position and orientation, said grabbing apparatus comprising:

a platform;

a base unit slidably attached to said platform;

a shoulder joint secured to said base unit, said shoulder joint being rotatable about a given position on said platform when said grabbing apparatus assumes its unlocked state;

an arm having a central longitudinal axis and being attached at a first end to said shoulder joint, said arm being rotatable about said axis and pivotable relative to said shoulder joint when said grabbing apparatus assumes its unlocked state;

closeable jaws secured to a second end of said arm, said closeable jaws assuming a normally open position when said grabbing apparatus assumes its unlocked state;

locking means comprising first, second, and third locking devices for selectively causing said grabbing apparatus to assume its locked state upon application of a single locking force thereto, said single locking force being distributed to said first, second, and third locking devices, said locked state having said closeable jaws forced towards a closed position, said arm locked and prevented from turning and pivoting relative to said shoulder joint, said shoulder joint locked and prevented from rotating relative to said base unit, and said base unit locked and prevented from moving relative to said platform;

means for applying said single locking force; and biasing means for causing said grabbing apparatus to assume its unlocked state upon removal of said single locking force, wherein each of said locking devices must overcome a force provided by said biasing means to cause said grabbing apparatus to change from an unlocked state to a locked state.

2. The grabbing apparatus as set forth in claim 1 wherein said biasing means comprises separate, independent biasing forces for each of said closeable jaws, shoulder joint, and base unit, each of said biasing forces causing its respective component of the grabbing apparatus to move towards its unlocked state.

3. The grabbing apparatus as set forth in claim 2 wherein said locking force of said locking means comprises a force that increases from an initial value less than the weakest of said biasing forces to a final value greater than the strongest of said biasing forces, said increasing locking force when applied to said grabbing apparatus overcoming each of said biasing forces at a predictable time after application of said increasing locking force, said predictable time for each biasing force being determined by the strength of each biasing force and the manner in which said locking force increases, whereby the respective lockable component associated with each biasing force starts to assume its locked state at the predictable time associated with each biasing force.

4. The grabbing apparatus as set forth in claim 3 wherein each of said biasing forces is a different value, whereby said locking force overcomes said biasing forces in an ordered sequence, causing the respective lockable components of said grabbing apparatus begin to assume their locked state in said ordered sequence.

5. The grabbing apparatus as set forth in claim 4 wherein said locking means includes a hydraulic system controlled with a single command signal, whereby a hydraulic locking force is created when said hydraulic system is initially activated to said final value.

6. The grabbing apparatus as set forth in claim 4 wherein said biasing means includes a biasing spring configured within each of said lockable components, said biasing spring forcing its associated lockable component to its unlocked state, the strength of each of said biasing forces being determined by the spring constant associated with each biasing spring.

7. The grabbing apparatus as set forth in claim 1 wherein said platform lies in an X-Y plane, and said base unit is slidably coupled to said platform for movement in both the X and Y directions.

8. The grabbing apparatus as set forth in claim 7 wherein said platform includes a track, said base unit being slidably attached to said track, said track having a pattern that moves about said platform in both the X and Y directions, thereby allowing movement of the base unit along said track in both the X and Y directions depending upon the course of said track.

9. A grabbing tool comprising, in combination, a remotely operated vehicle having at least one manipulator protruding therefrom and a platform adjacent said manipulator, said grabbing tool comprising:
an arm having a central longitudinal axis, and having a clamping mechanism disposed at a first end thereof, said clamping mechanism including biasing means for holding said clamping mechanism in a normally open position;
a shoulder joint connecting a second end of said arm to said platform, said shoulder joint allowing said arm to rotate about said axis and to pitch relative to said platform;
means for securing said shoulder joint to said platform, said securing means allowing said shoulder joint and arm to yaw relative to said platform, said securing means further allowing said shoulder joint to slide about on said platform to a desired location while still remaining movably secured to said platform;
locking means comprising first, second, and third locking devices for selectively forcing said clamping mechanism to a closed clamping position and locking said clamping mechanism in said closed clamping position, locking said arm to said shoulder joint, and locking said shoulder joint to said platform, respectively, each of said locking devices acting against a force provided by biasing means which tend to force the locking means to an unlocked position; and
means for actuating said locking means;
whereby said manipulator may move said grabbing tool to a desired position and orientation relative to said platform, when the clamping mechanism is in the open position, and when said arm and said shoulder joint are unlocked and free to move as needed in order to achieve said desired position and orientation, whereupon said locking means may be actuated, thereby locking said clamping mechanism, arm, and shoulder joint against movement and causing said grabbing tool to maintain said position and orientation.

10. The grabbing tool as set forth in claim 9 wherein said locking means includes
means for generating a single command signal from a location remote from said vehicle, and
means responsive to said single command signal for generating a single locking force that is applied to said clamping mechanism, shoulder joint, and shoulder/platform securing means,
said single locking force causing said grabbing tool to become locked.

11. The grabbing tool as set forth in claim 10 wherein said locking means further includes locking sequence control means responsive to said single locking force for locking said clamping mechanism, shoulder joint, and shoulder/platform securing means in a prescribed sequence.

12. The grabbing tool as set forth in claim 11 wherein said locking sequence control means includes means internal to said grabbing tool for generating respective biasing forces that maintain said clamping mechanism, shoulder joint, and shoulder/platform securing means in an unlocked state in the absence of said single locking force, each of said respective biasing forces having a value different from the others; the application of said single locking force to said clamping mechanism, shoulder joint, and shoulder/platform securing means overcoming said respective biasing forces in a sequence controlled by the relative strength of each of said biasing forces with respect to said single locking force.

13. The grabbing tool as set forth in claim 12 wherein said means for generating respective biasing forces within said grabbing tool comprises springs mounted within each of said clamping mechanism, shoulder joint, and shoulder/platform securing means, each spring generating a biasing force different from the others as a function of its spring constant.

14. The grabbing tool as set forth in claim 13 wherein said single locking force comprises a hydraulic force that increases from a minimum value less than the weakest biasing force to a maximum value greater than the strongest biasing force.

* * * * *

UNITED STATES PATENT AND TRADEMARK OFFICE
CERTIFICATE OF CORRECTION

PATENT NO. : 5,039,254

DATED : 8/13/91

INVENTOR(S) : Piercy

It is certified that error appears in the above-identified patent and that said Letters Patent is hereby corrected as shown below:

ON THE TITLE PAGE,
IN THE ABSTRACT: Line 16, change ";" to --:--.
Column 12, line 36, after "time", insert the material appearing in Column 13, line 4, beginning with "later..." through Column 13, line 41, ending with "...decrease". Column 13, lines 4-41, move the material "later...decrease" and insert it in Column 12 as indicated above.

Signed and Sealed this

Twenty-third Day of February, 1993

*Attest:*

STEPHEN G. KUNIN

*Attesting Officer*     *Acting Commissioner of Patents and Trademarks*